US012127998B2

(12) United States Patent
Higgins

(10) Patent No.: US 12,127,998 B2
(45) Date of Patent: Oct. 29, 2024

(54) SENSOR BASED CLEAR PATH ROBOT GUIDE

(71) Applicant: United States Government as Represented by the Department of Veterans Affairs, Washington, DC (US)

(72) Inventor: Brian L. Higgins, Los Altos, CA (US)

(73) Assignee: United States Government as Represented by the Department of Veterans Affairs, Washington, DC (US)

(*) Notice: Subject to any disclaimer, the term of this patent is extended or adjusted under 35 U.S.C. 154(b) by 0 days.

(21) Appl. No.: 18/512,966

(22) Filed: Nov. 17, 2023

(65) Prior Publication Data
US 2024/0130921 A1   Apr. 25, 2024

Related U.S. Application Data

(63) Continuation of application No. 16/341,693, filed as application No. PCT/US2017/056640 on Oct. 13, 2017, now Pat. No. 11,865,062.
(Continued)

(51) Int. Cl.
*G01D 1/00* (2006.01)
*A61H 3/00* (2006.01)
(Continued)

(52) U.S. Cl.
CPC ............... *A61H 3/061* (2013.01); *A61H 3/00* (2013.01); *A61H 3/02* (2013.01); *A61H 3/04* (2013.01);
(Continued)

(58) Field of Classification Search
CPC . A61H 3/061; A61H 3/00; A61H 3/02; A61H 3/04; A61H 3/06; A61H 2003/063;
(Continued)

(56) References Cited

U.S. PATENT DOCUMENTS 5,311,880 A * 5/1994 Lancaster ............... A61H 3/04
600/595
5,570,814 A   11/1996 Havlovitz
(Continued)

FOREIGN PATENT DOCUMENTS

| CN | 204484697 U | 7/2015 |
| KR | 100615670 B1 | 8/2006 |

(Continued)

*Primary Examiner* — Yonel Beaulieu
(74) *Attorney, Agent, or Firm* — Ballard Spahr LLP

(57) ABSTRACT

A guide system is provided that uses a plurality of sensors to identify and determine a clear path for an ambulatory vision impaired person. The system includes one or more wheels that rotate to propel the system, a platform supported by the one or more wheels and housing a processor, a rigid harness with a haptic feedback grip that is positioned to be grasped by an operator, and one or more sensors configured to sense information about the environment. In operation, the processor analyzes information sensed by the sensors to identify object in the path of the guide system and sends messages to the operator to allow the operator to avoid the identified objects. The messages may be sent to the operator via the haptic feedback grip or audibly via a speaker or via a wireless connection to a haptic or audio device being worn by the operator.

20 Claims, 6 Drawing Sheets

Related U.S. Application Data

(60) Provisional application No. 62/408,609, filed on Oct. 14, 2016.

(51) Int. Cl.
| | |
|---|---|
| *A61H 3/02* | (2006.01) |
| *A61H 3/04* | (2006.01) |
| *A61H 3/06* | (2006.01) |
| *G01S 15/88* | (2006.01) |
| *G01S 15/931* | (2020.01) |
| *G01S 17/88* | (2006.01) |
| *G01S 17/931* | (2020.01) |
| *G05D 1/00* | (2006.01) |
| *G05D 1/622* | (2024.01) |
| *G06F 3/01* | (2006.01) |
| *G01S 13/931* | (2020.01) |
| *G01S 15/86* | (2020.01) |

(52) U.S. Cl.
CPC ............... *A61H 3/06* (2013.01); *G01S 15/88* (2013.01); *G01S 15/931* (2013.01); *G01S 17/88* (2013.01); *G01S 17/931* (2020.01); *G05D 1/0238* (2013.01); *G05D 1/622* (2024.01); *G06F 3/016* (2013.01); *A61H 2003/063* (2013.01); *A61H 2201/1215* (2013.01); *A61H 2201/5048* (2013.01); *A61H 2201/5064* (2013.01); *A61H 2201/5069* (2013.01); *A61H 2201/5076* (2013.01); *A61H 2201/5079* (2013.01); *A61H 2201/5084* (2013.01); *A61H 2201/5092* (2013.01); *A61H 2201/5097* (2013.01); *G01S 13/931* (2013.01); *G01S 15/86* (2020.01)

(58) Field of Classification Search
CPC .... A61H 2201/1215; A61H 2201/5048; A61H 2201/5064; A61H 2201/5069; A61H 2201/5076; A61H 2201/5079; A61H 2201/5084; A61H 2201/5092; A61H 2201/5097; G01S 15/88; G01S 15/931; G01S 17/88; G01S 17/931; G01S 13/931; G01S 15/86; G05D 1/0238; G05D 1/622; G06F 3/016
See application file for complete search history.

(56) References Cited

U.S. PATENT DOCUMENTS

| | | |
|---|---|---|
| 5,973,618 A | 10/1999 | Ellis |
| 6,356,210 B1 | 3/2002 | Ellis |
| 9,770,382 B1 | 9/2017 | Ellis |
| 2008/0251110 A1 | 10/2008 | Pede |
| 2012/0029696 A1 | 2/2012 | Ota et al. |
| 2012/0053826 A1 | 3/2012 | Slamka |
| 2013/0332018 A1 | 12/2013 | Kim |
| 2017/0224573 A1* | 8/2017 | Challa ............... A45B 9/04 |
| 2018/0289579 A1* | 10/2018 | Agrawal ............ A61H 3/008 |
| 2023/0096006 A1* | 3/2023 | Blair ............. G08B 21/0211 |
| | | 600/586 |

FOREIGN PATENT DOCUMENTS

| | | | | |
|---|---|---|---|---|
| KR | 101289966 B1 | 7/2013 | | |
| WO | 2012040703 A2 | 3/2012 | | |
| WO | WO-2015063765 A1 * | 5/2015 | ............ | A45B 3/00 |

* cited by examiner

SENSOR BASED CLEAR PATH ROBOT GUIDE

CROSS REFERENCE TO RELATED PATENT APPLICATIONS

This application is a continuation of U.S. patent application Ser. No. 16/341,693, filed on Apr. 12, 2019, which is a U.S. national stage entry of International Application No. PCT/US17/056640, filed on Oct. 13, 2017, now U.S. Pat. No. 11,865,062, which claims priority to U.S. Provisional Patent Application No. 62/408,609, filed on Oct. 14, 2016, which are hereby incorporated by reference in their entirety.

BACKGROUND

Field of the Invention

The present invention generally relates to robotics and more particularly relates to a sensor based clear path robot guide for the vision impaired.

Related Art

Conventional assistive technology available to ambulatory vision impaired people has been around for decades and centuries. Specifically, the white cane device has been used by ambulatory vision impaired for over two centuries while trained guide dogs have been used by the vision impaired for seven or more decades. These assistive technologies are helpful, but they have not been updated or improved since their respective introductions. A white cane investigates the environment by sweeping side to side in a three foot width pattern. The white cane user senses objects in his or her path by coming in contact with the white cane. The guide dog guides a person in the direction that the person commands the dog to take. The guide dog avoids objects in the given path. With the dog guide method, the vision impaired person does not make physical contact with the environment.

The World Health Organization (WHO) reported in 2014 that approximately 285 million people (about 4% of the total population) worldwide were estimated to be visually impaired, with 39 million blind and 246 million suffering from low vision. The development of technologies that provide improved tactile, orientation and sensory perception to enable safe navigation is important for individuals who are vision impaired. However, most of the commercially available products to assist the vision impaired in object avoidance and safe navigation are similar to that used more than fifty years ago.

There are three main product types that aid vision impaired individuals for safe navigation through their surroundings. These include electronic travel aids (ETAs), electronic orientation aids (EOAs), and position locator devices (PLDs). Many researchers and ETA product developers believe these traditional methods should be replaced by products comprised of a variety of sensors, cameras and other technologies capable of gathering and relaying information about proximal surroundings for clear path navigation. Vision impaired individuals have had access to commercially available ETA's such as ultrasound sensors, other sonic-related guides, infrared sensors and a variety of camera/vision technologies, but wide-scale adoption of any ETA has not occurred to significantly replace traditional methods.8 It is not fully understood if the lack of significant adoption is due to a lack of confidence in ETAs or their cost.

The emergence of artificial intelligence and improvement, miniaturization and reduced cost of laser-based sensors has given more hope to researchers and ETA product developers that devices with improved capabilities for object avoidance and clear path navigation can eventually be made to replace traditional methods. Additionally, these same factors, specifically the miniaturization of sensors, have given rise to wearable navigation systems that some assume will be more adoptable than previous ETA's. Therefore, what is needed is a modern assistive technology for use by ambulatory vision impaired people.

SUMMARY

In order to solve the problems discussed above, the present disclosure is directed toward a robotic device that is capable of providing clear path detection and object avoidance as an alternative to a guide dog, white cane and other ETA's for vision impaired individuals. The robotic device is comprised of one or more of: optical, proximal and ultrasonic sensors, GPS, WiFi, an accelerometer, a central processing unit and a wheelbase capable of tactile feedback. The collection of integrated sensors and communication devices are able to perceive and reveal rich details about a vision impaired person's surroundings, a significant improvement over a conventional guide dog or white cane.

The guide system described herein provides more detail about the operator's environment. It can provide clear path detection, object avoidance, and computerized information as it navigates a clear safe path. The guide system includes a rigid but collapsible harness for the operator to grasp and thereby engage a direct tactile connection to the surface. The rigid harness is attached to a base with one or more wheels. The base comprises a housing that completely or partially surrounds and protects a motor and a processor that analyzes information from the one or more sensors such as Lidar Radar Sensors, ultrasonic sensors, accelerometers, and Proximity Sensors. The processor may also analyze information from one or more wireless communication devices connected to the guide system via WIFI or Bluetooth or the like. For example, the operator may wear a Bluetooth earpiece or wristwatch to receive auditory feedback from the guide system. The combination of the one or more wheels upon the surface and the rigid harness connected to the one or more wheels provides tactile feedback from the surface directly to the operator when the operator grasps the harness.

In operation, the operator grasps the rigid harness and begins to push the guide system that rolls along the surface using its wheels, which provides a direct tactile connection between the operator and the surface. As the operator proceeds forward along a primary course of travel, the sensors attached to the guide system provide sensor data to a processor that analyzes the sensor data to identify a clear path for the operator to travel. Feedback to the operator may be auditory (beeps, sounds, speech) to alert the operator to the presence of an object in the primary course of travel. Feedback to the operator may also be though a haptic user interface in the harness or other device.

The guide system provides a safe and clear path for the visually impaired and provides independence and confidence. The guide system can guide a visually impaired person in a path from point A to point B, avoid obstacles on the surface, as well as warn of obstacles on either side of and above the operator. The guide system is configured to detect drop-offs such as curbs and stairs and find openings such as doors and gates, and identify the presence of objects. The harness, base and wheels of the guide system can be used as a navigation device. With a single sensor and user interface feedback system (e.g., a speaker), the guide system provides basic object detection and avoidance.

Advantageously, to solve the problems of the conventional assistive technology, described herein are a system, apparatus and methods of use for a robot guide that uses a plurality of sensors to identify and determine a clear path for an ambulatory vision impaired person. In one aspect, the robot guide includes a set of wheels that rotate to propel the robot, a platform supported by the set of wheels and housing controlling electronics for the robot, a handle that is positioned to be grasped by the operator and at least two sensors that are configured to sense information about the guide system environment, for example, information about objects in a forward path of the guide system. The guide system also includes a processor configured to analyze information from the sensors and construct and send messages to the operator via one or more user interfaces. For example, the processor may send an audible message to the operator via a speaker or a tactile message to the operator via the handle or via an interface device being worn by the operator (e.g., a watch or headset or earpiece, etc.).

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

The following element numbers are used throughout the drawings:

10—guide system
15—wheel
20—platform
25—housing
30—harness
35—grip
37—accelerator/decelerator
40—sensors
45—CPU
50—motor
55—tray
60—tilt preventer
65—user interface
70—wireless communication device

DETAILED DESCRIPTION

Certain embodiments disclosed herein provide for a sensor based clear path robot guide system that is used as an ambulatory assistance aid for the vision impaired. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1A:
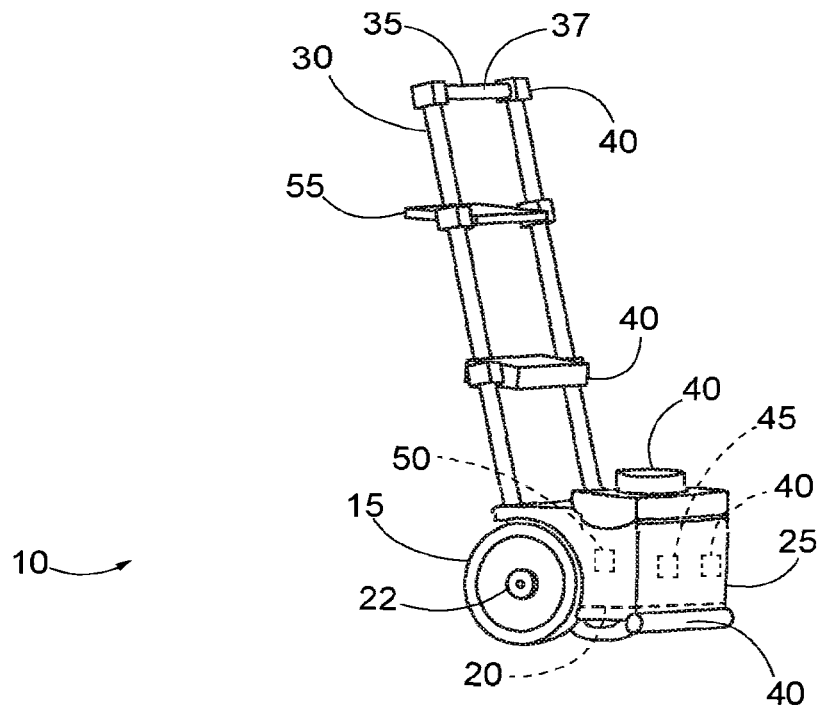
FIG. 1A is a block diagram illustrating an example sensor based clear path robot guide system according to an embodiment of the invention.

FIG. 1A is a block diagram illustrating an example sensor based clear path robot guide system 10 according to an embodiment of the invention. In the illustrated embodiment, the system 10 comprises two wheels 15 connected by an axle 22 that supports a platform 20 that in turn supports a housing 25. The axle 22, platform 20 and housing 25 are positioned above the ground and are connected to a harness 30 that extends upward away from the platform 20 and housing 25 and the axle 22. At a distal end (away from the housing) the harness 30 comprises a grip 35 that is configured for an operator to grasp. In one embodiment, the grip 35 may have an integrated accelerator/decelerator 37 configured to drive the motor 50. The guide system 10 also comprises plural sensors 40 that are connected to the platform 20, housing 24 and/or harness 30 at different locations. In one embodiment, the plural sensors 40 may include one or more of LIDAR radar sensors, ultrasonic sensors, accelerometers, proximity sensors, radar sensors, infrared sensors, imaging sensors, GPS sensors, and the like. Preferably, a least one of the plurality of sensors 40 is positioned at different elevations along the guide system 10 to maximize the combined coverage of the plural sensors 40. In one embodiment, the harness 30 may also support one or more trays 55 or baskets or other helpful containers for storage of items by the operator.

The housing 25 may also support plural sensors 40 to expand the combined coverage of the total sensors 40 that are connected to the guide system 10. The housing 25 also defines an interior cavity in which electronic devices are located. Electronic devices may include devices such as a central processing unit ("CPU") 45, one or more additional sensors 40 such as accelerometers, and global position system ("GPS") receivers, and communication devices such as blue tooth radios and the like. The interior cavity may also include the motor 50 and a power source (e.g., a battery) configured to power the motor 50 and other electronics on the guide system 10.

The various sensors 40 that are connected to the guide system 10 can include ultrasonic sensors, radar sensors, camera sensors, infrared sensors, light detection and ranging ("LIDAR") sensors and the like. These sensors 40 can be combined in any variety to maximize the sensor input to the CPU 45 in order to carry out the function of the guide system 10.

In operation, the guide system 10 senses and analyzes environmental information and provides feedback to the operator of the guide system 10. Haptic or auditory feedback may be provided to the operator to indicate how to navigate through the environment. In one embodiment, the guide system 10 provides feedback to the operator to facilitate the operator following a predetermined route. This can be accomplished by the processor 45 identifying a predetermined route and receiving and analyzing GPS information to provide feedback to the operator regarding macro adjustments to the current route (e.g., turn right, turn left). The processor 45 also analyzes sensor data to provide feedback to the operator regarding micro adjustments to the current route (e.g., step down, step up, veer right, veer left, stop, etc.). Micro adjustments can advantageously allow the operator to avoid obstacles while maintaining course.

In one embodiment, one or more motors 50 may be positioned within the housing 25 to allow the guide system 10 to turn the wheels 15 and propel the guide system 10 and thereby pull the operator along a predetermined route. Advantageously, the processor 45 in the housing is configured to control the one or more motors 50 to turn the wheels 15 synchronously and/or asynchronously/individually. For example, the processor 45 may control the wheels 15 to turn in opposite directions to rapidly turn the guide system 10 or the processor 45 may control the wheels 15 to turn in the same direction at different rates to slowly turn the guide system 10 in a desired arc.

Figure 1B:
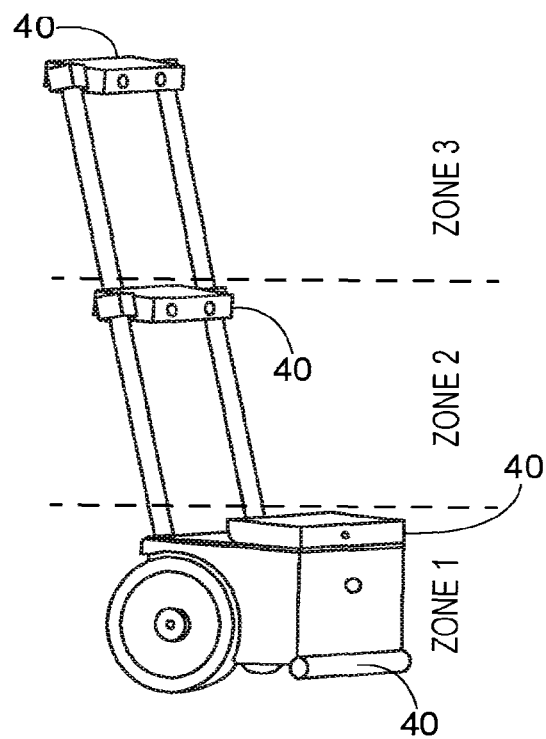
FIG. 1B is a block diagram illustrating an example sensor based clear path robot guide system with a plurality of sensor zones according to an embodiment of the invention.

FIG. 1B is a block diagram illustrating an example sensor based clear path robot guide system 10 with a plurality of sensor zones according to an embodiment of the invention. In the illustrated embodiment, the guide system 10 has a plurality of sensors 40. There may be one or more sensors 40 per sensor zone. The various sensor zones may have gaps between them, may be adjacent, or may overlap by a small or large portion. In one embodiment where the sensor zones are adjacent, the lowest zone 1 extends from the surface upon which the wheels 15 rest (i.e., 0 inches) to 24 inches, the next zone 2 is from 24 inches to 48 inches and the next zone 3 is from 48 inches to 72 inches. There may be additional or fewer zones in alternative embodiments. In one embodiment, the one or more sensors 40 in each zone may collectively provide feedback to the operator by a specific means. For example, zone 1 sensors 40 may provide auditory feedback to the operator via a Bluetooth earpiece while the zone 2 sensors 40 may provide haptic feedback to the operator via the grip 35 while the zone 3 sensors 40 may provide auditory feedback via one or more speakers.

Figure 1C:
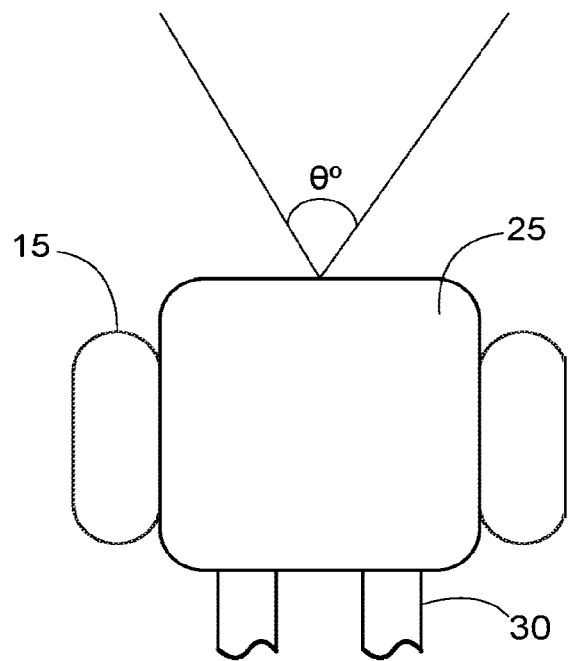
FIG. 1C is a block diagram illustrating an example sensor based clear path robot guide system with a forward sensor angle width according to an embodiment of the invention.

FIG. 1C is a block diagram illustrating an example sensor based clear path robot guide system 10 with a forward sensor angle width according to an embodiment of the invention. In the illustrated embodiment, the forward sensor has an angle of θ°. Advantageously, the angle θ may vary in alternative embodiments, for example the angle θ may vary from 10° to 180°. In the illustrated embodiment, one or more sensors 40 are configured to sense information within the angle θ and provide sensor output to the processor 45.

Figure 1D:
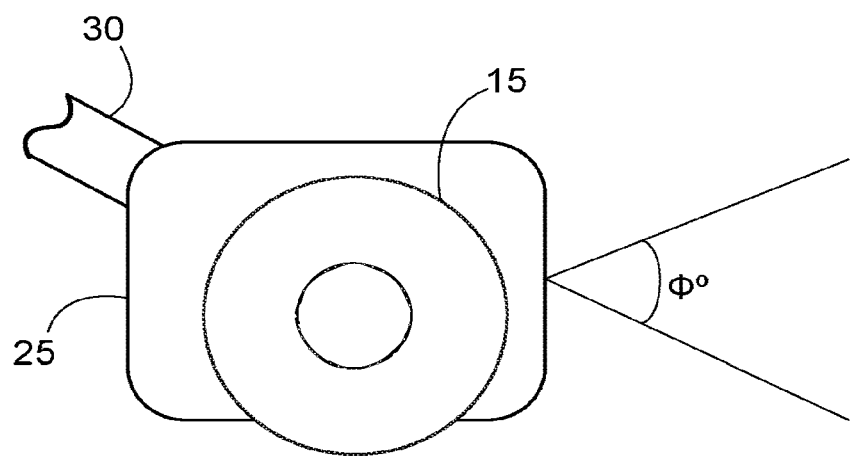
FIG. 1D is a block diagram illustrating an example sensor based clear path robot guide system with a forward sensor angle height according to an embodiment of the invention.

FIG. 1D is a block diagram illustrating an example sensor based clear path robot guide system 10 with a forward sensor angle height according to an embodiment of the invention. In the illustrated embodiment, the forward sensor has an angle of Φ°. Advantageously, the angle Φ may vary in alternative embodiments, for example the angle θ may vary from 10° to 180°. In the illustrated embodiment, one or more sensors 40 are configured to sense information within the angle Φ and provide sensor output to the processor 45.

Figure 2:
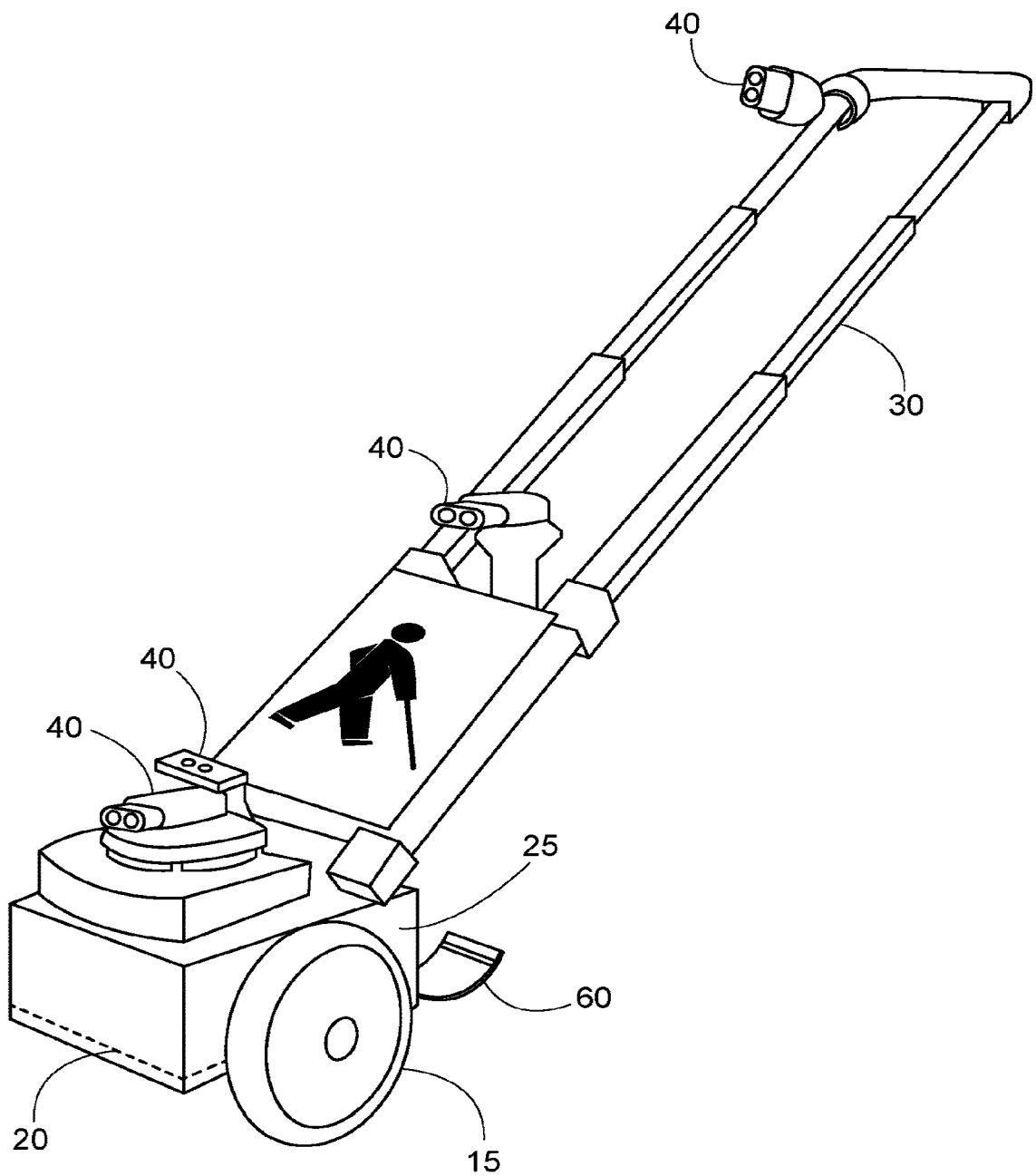
FIG. 2 is a block diagram illustrating an alternative example sensor based clear path robot guide system according to an embodiment of the invention.

FIG. 2 is a block diagram illustrating an alternative example sensor based clear path robot guide system 10 according to an embodiment of the invention. Elements previously described will not be further described with respect to FIG. 2. In the illustrated embodiment, the guide system 10 comprises a telescoping harness 30 that adjusts to the height of the operator. Additionally, the guide system 10 comprises a tilt preventer 60 that extends from a back side of the platform 20 or housing 25. The tilt preventer 60 advantageously performs multiple functions. A first function is that the tilt preventer 60 functions as a kick stand to allow the guide system 10 to independently stand upright without intervention by an operator. A second function is that the tilt preventer functions 60 as a brake when the operator tilts the guide system 10 backward to drag the tilt preventer 60 against the surface upon which the guide system 10 is moving and thereby increase friction. A third function is that the tilt preventer 60 functions as a mechanical assist when lowering the guide system 10 down a step or curb and also functions as a mechanical assist when lifting the guide system 10 up a step or curb.

Figure 3A:
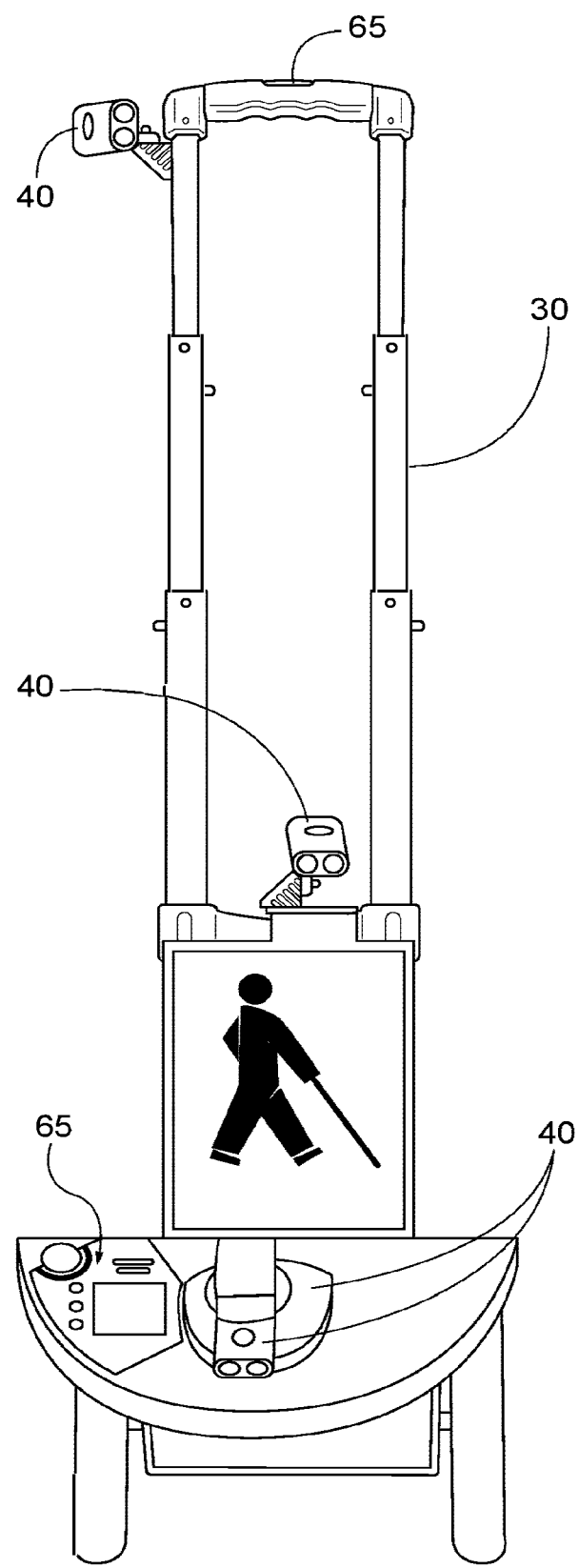
FIG. 3A is a block diagram illustrating an alternative example sensor based clear path robot guide system according to an embodiment of the invention.

FIG. 3A is a block diagram illustrating an alternative example sensor based clear path robot guide system 10 according to an embodiment of the invention. Elements previously described will not be further described with respect to FIG. 3A. In the illustrated embodiment, the guide system 10 comprises a user interface 65. The user interface 65 may include physical buttons, a viewing screen, a touch screen, colored lights (e.g., light emitting diodes ("LEDs")), vibration surfaces and the like. In the illustrated embodiment, the user interface 65 is positioned on the housing 25. In an alternative embodiment, the user interface 65 may be connected to the harness 30, for example near the distal end and integrated with the grip 35. Additionally, portions of the user interface 65 may be separated, for example with a haptic interface portion integrated with the grip 35 and an illuminated portion positioned on the housing 25 and an auditory portion (e.g., a speaker) integrated near the grip 35 and/or near the housing 25 or along the harness 30. Alternative combinations are also possible.

Figure 3B:
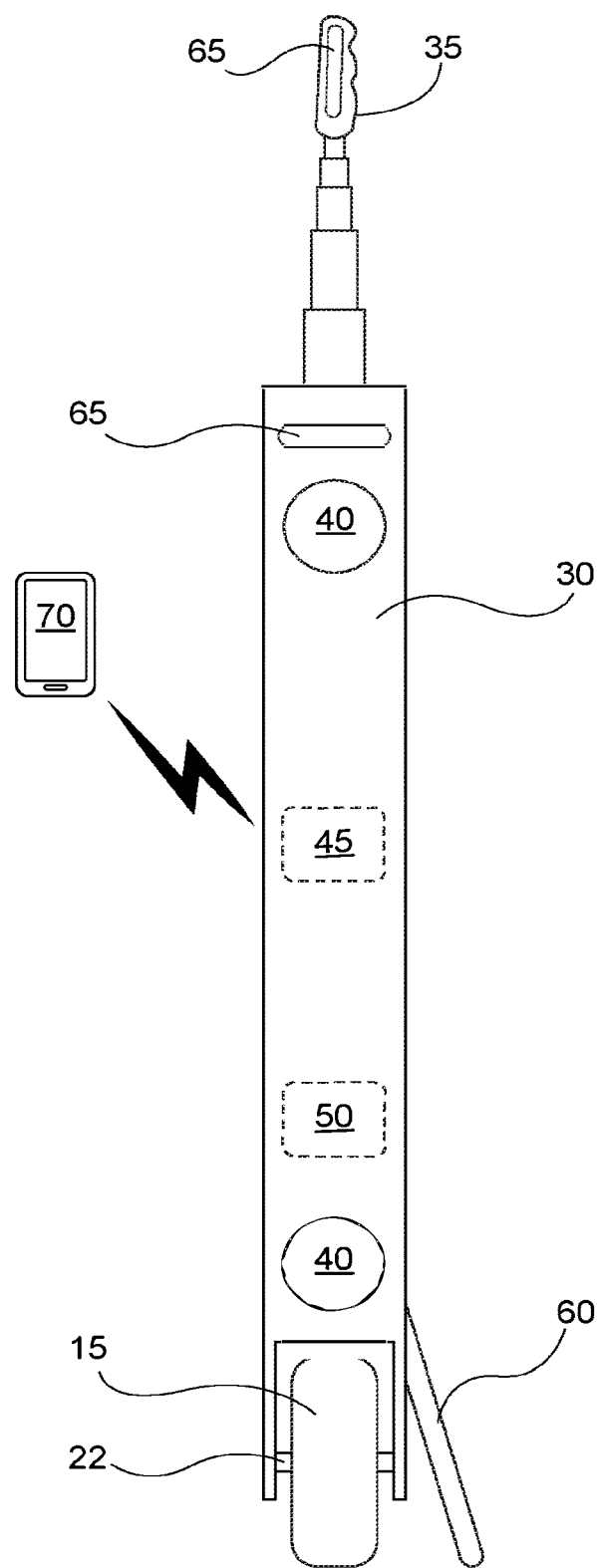
FIG. 3B is a block diagram illustrating an alternative example sensor based clear path robot guide system according to an embodiment of the invention.

FIG. 3B is a block diagram illustrating an alternative example sensor based clear path robot guide system 10 according to an embodiment of the invention. In the illustrated embodiment, the guide system 10 comprises a single wheel 15 with an axle 22. A harness 30 is connected to the axle 22 at a proximal end of the harness 30 and the wheel 15 and axle 22 support the harness 30 that extends upward toward a grip 35 that is positioned at a distal end of the harness 30. The guide system 10 may also include a tilt preventer 60.

Additionally, one or more sensors 40 are connected to or integrated with the guide system 10, for example positioned in different sensor zones. The one or more sensors 40 are communicatively coupled with a processor 45 that is configured to receive sensor information from the one or more sensors 40 and analyze the sensor information to provide feedback to an operator of the guide system 10. The processor 45 is configured to provide feedback to an operator of the guide system 10 via one or more user interfaces 65, which may include a haptic feedback user interface 65 portion and an audio feedback user interface 65 portion. Various portions of the user interface 65 may be positioned anywhere along the guide system 10, for example in or on the grip 35 and in or on the harness 30.

In one embodiment, a motor 50 may be optionally included in the guide system 10. In such an embodiment, the motor is configured to drive the wheel 15 to facilitate acceleration by the operator of the guide system 10 or to provide resistance to the operator of the guide system 10 and thereby facilitate deceleration by the operator of the guide system 10. Advantageously, the processor 45 is configured to control the motor to provide variable speed acceleration or deceleration as well as complete stop braking.

In one embodiment, the processor 45 of the guide system 10 is communicatively coupled to an external wireless communication device 70 and is configured to communicate with the wireless communication device 70 to receive operating instructions. For example, the wireless communication device 70 may include a GPS capability and a maps application that creates a route for the operator of the guide system 10. In such an embodiment, the wireless communication device 70 sends instructions to the processor 45 of the guide system 10 and the processor 45 of the guide system 10 carries out those instructions, for example to provide route feedback to the operator of the guide system 10. Advantageously, in combination with the wireless communication device 70 managing the route, the guide system 10 uses its processor 45 to monitor sensor information from the various sensors 40 and provide clear path feedback to the operator of the guide system 10.

In one embodiment, the processor 45 of the guide system 10 is configured to monitor and receive sensor information from the various sensors 40 and provide the sensor information to the wireless communication device 70 for analysis. In such an embodiment, the wireless communication device 70 comprises the user interface 65 and the wireless communication device 70 is configured to provide audio and/or haptic feedback to the operator of the guide system 10.

Example Embodiments

In one embodiment, the guide system 10 operates on an expandable platform that allows additional sensors and user interfaces to be incorporated as needed. The guide system 10 provides a physical connection between the operator, who grasps the harness, and the surface upon which the operator is walking. The guide system 10 uses a combination of sensors to identify objects in the path of the operator and uses the user interface systems to provide instructions to the operator to facilitate object avoidance. Additionally, the guide system 10 is configured to follow a predetermined route to facilitate point to point travel by the operator.

The guide system 10 comprises a rigid harness that is configured to extend out and adjust to the characteristics of the operator, for example the height of the operator. The rigid harness is attached to the housing, which is supported on one or more wheels 15. Advantageously, vibration from the surface travels through the wheels 15 and the rigid harness to provide a direct tactile connection between the operator and the surface.

In one embodiment, attached to the top of the housing is a LIDAR Radar which is the primary sensor of the device. In addition to the LIDAR Radar, the device also uses at least one ultrasonic sensor positioned on top of the LIDAR Radar. The ultrasonic sensor on top of the LIDAR Radar advantageously senses information about any objects in the path of travel and the processor analyzes the sensed information to identify a primary clear path for travel by way of detecting any objects in the current path and determining any necessary micro course adjustments to ensure object avoidance.

In one embodiment, a wired or wireless ear piece with a speaker (e.g., Bluetooth) is worn by the operation and audio feedback is provided from the guide system 10 to the operator via the ear piece. In one embodiment, the ultrasonic sensor may provide audio feedback directly to the earpiece. In an alternative embodiment, the processor generates an audio message based on an analysis of the sensor data and provides the audio message to the operator via a connection (wired or wireless) to the earpiece speaker. The content of an audio message can be a simple sound or beep or it may be synthesized speech.

In one embodiment, a separate wireless communication device (e.g., a smart phone) provides GPS location information, map guidance, and auditory location and/or directions/instructions in connection with the guide system 10. In such an embodiment, the separate wireless communication device provides the operator with the point-to-point travel capability and macro course adjustments while the guide system 10 provides the micro course adjustments for object avoidance and direct environment navigation.

In an alternative embodiment, LIDAR Radar performs both the micro course adjustments and the macro course adjustments in connection with a predetermined route (e.g., a preplanned Google map travel route). The LIDAR Radar accordingly provides sensor data for analysis to provide a clear path for travel and object avoidance.

Importantly, the combination of sensors on the guide system 10 are configured to sense information about the immediate environment to enable surface navigation. Because all objects are in some way attached to the surface due to gravity, objects such as walls, tables, chairs, trees, signs, etc. are all positive masses that are connected to the surface and capable of being sensed by the combination of sensors on the guide system 10. Similarly, open doorways, open manholes, side streets, alleyways, etc. are negative masses that are also capable of being sensed by the combination of sensors on the guide system 10. Accordingly, the combination of sensors on the guide system 10 scan for positive and negative masses appearing in the primary course of travel. The combination of sensors on the guide system 10 also scan for increases or decreases in elevation (surface).

In one embodiment, the combination of sensors on the guide system 10 sense information in the forward direction. For example, the sensors may be configured to sense information in an angular direction that is five degrees to the left and right of the center of the primary course of travel of the guide system 10. The sensors may be configured to sense information in an angular direction that is five degrees upward and downward of the center of the primary course of travel of the guide system 10. The sensors may also be configured to sense information at wider or narrower angles to the left, right, upward and downward.

Advantageously, forward scanning detects objects that are within the primary course of travel of the guide system 10. Additionally, a wider angle on the upward scan can assist the operator by detecting low hanging branches and other objects extending into the primary course of travel from a sideward or topward angle. The processor is advantageously configured to analyze the sensor data and determine an X,Y footprint of an object and plan appropriate micro course adjustments to allow the operator to take evasive action. In one embodiment, information about objects in the path of an operator is stored in memory in connection with location data for the object so that the presence of the object can be predicted during future travel by the operator or by another operator. Accordingly, information about a first object at a first location may be communicated from a first guide system 10 to a central server for storage and subsequently provided to a second guide system 10 having a predetermined route that includes the first location.

In one embodiment, the guide system 10 performs its operation by orientating to its initial position and heading, for example by determining its GPS coordinates and heading and by also identifying a predetermined course. Subsequently, the guide system 10 periodically updates its position and heading information. The frequency of such updates can be configured as needed.

During navigation, the guide system 10 continuously or periodically scans its environment (e.g., forward, backward, upward, downward) and the processor analyzes the sensor data to identify objects in the primary course of travel and to calculate micro adjustments to the primary course of travel to avoid such identified objects. Advantageously, because the vast majority of objects in the primary course of travel are attached to the surface of the primary course of travel, the majority of the plural sensors on the guide system 10 can be redundantly trained on the forward surface.

Additionally, during navigation of a repeat trip, information from prior trips of the same course can be employed to predict the location of objects in the primary course of travel. Additional information obtained during repeat trips can be added to a rich collection of information about an overall trip and/or portions of a trip that also appear in other trips such that an object database can be continuously updated and optimized with information about objects appearing in the primary course of travel as sensed by one or more guide systems 10 over time. Additionally, during navigation of a first time trip, the guide system 10 may be configurable to train additional sensor resources on the forward surface to maximize object detection and avoidance capabilities of the guide system 10.

In one embodiment, one or more sensors are trained to scan objects attached to the forward surface because this region of the primary course of travel is the most significant region for forward navigation. The surface refers to the floor, asphalt, concrete, ground, grass, or otherwise of the traveler's environment and primary course of travel. Periodic and/or continuous scanning of the surface and analysis of the sensed information from the surface to identify the presence of one or more objects is very important because 98% of all objects in the primary course of travel are attached to the surface.

Accordingly, the guide system 10 scans the forward surface and the processor analyzes the information from the sensors trained on the forward surface and the processor subsequently plans a clear path in front of the operator. The clear path comprises zero or more micro adjustments to the current primary course of travel (e.g., the current heading). The processor of the guide system 10 accordingly constructs and updates an environmental map based on information received from the various sensors connected to the guide system 10. Using the environmental map, the processor plans a clear path free of obstacles for the operator to follow and directions are communicated to the operator by way of a speaker in an earpiece or haptic feedback to the grip on the harness or other audio, haptic or even visual cues. In one embodiment, the rigid harness allows the operator to push the guide system 10 at a desired pace while following the micro course adjustment instruction received from the processor of the guide system 10 and based on sensor information about obstacles in the primary course of travel.

In one embodiment, the guide system 10 comprises a kit that can be attached to a wheeled apparatus. The wheeled apparatus may be a walker, running cane, a bicycle or tricycle, an exercise device, and electric bicycle or tricycle, an Elliptigo®, a Segue®, or other such devices. The kit includes one or more sensors that are configured to sense environmental information and provide the sensed information to a wireless communication device 70 for analysis. The wireless communication device 70 is configured to receive and analyze the sensor information and provide feedback (e.g., haptic and/or audio) and/or instructions to the operator of the guide system 10. For example, the wireless communication device 70 may provide route guidance (e.g., turn right) or object avoidance (e.g., veer right to avoid a fire hydrant). In one embodiment, route guidance information may originate from a mapping application on the wireless communication device while object avoidance information may originate from the one or more sensors attached to the wheeled apparatus.

Figure 4:
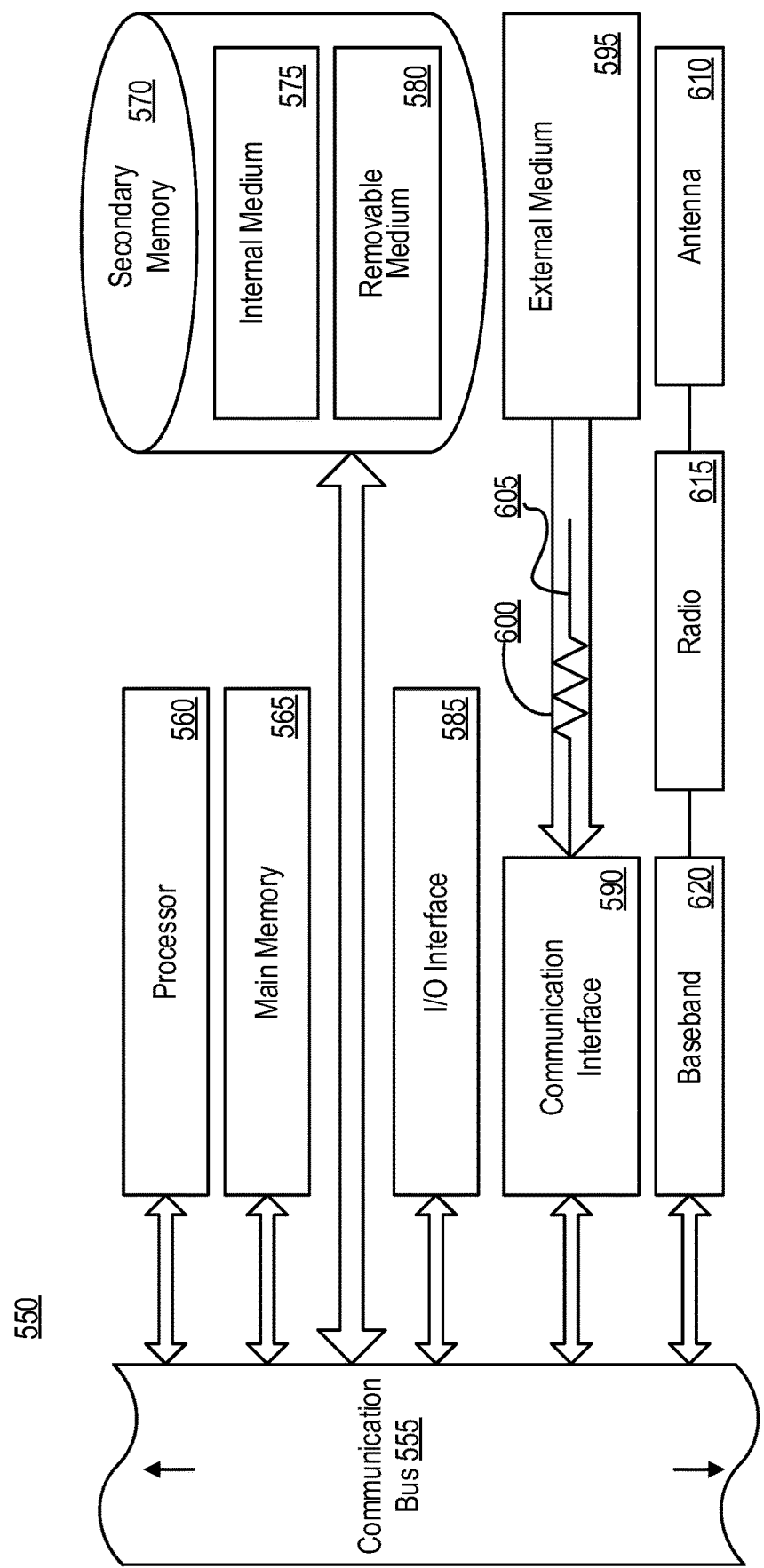
FIG. 4 is a block diagram illustrating an example wired or wireless processor enabled device that may be used in connection with various embodiments described herein.

FIG. 4 is a block diagram illustrating an example wired or wireless system 550 that may be used in connection with various embodiments described herein. For example the system 550 may be used as or in conjunction with a robot guide as previously described with respect to FIGS. 1-3. The system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include an input/output ("I/O") interface 585. The I/O interface 585 facilitates input from and output to external devices. For example the I/O interface 585 may receive input from a keyboard or mouse and may provide output to a display. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a radio, a network interface card ("NIC"), a wireless data card, a communications port, a PCMCIA slot and card, an infrared interface, and an IEEE 1394 fire-wire, just to name a few. In one embodiment, the communication interface 590 comprises a global positioning satellite ("GPS") receiver that is configured to receive information from a GPS network and provide that information to the processor or other resources of the system 550 for translation into location information on a map. Advantageously, position information on a map may assist in the overall guidance for the vision impaired.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), national marine electronics association ("NMEA") standards, and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication. Wireless communication can be implemented over a wireless voice and over a wireless data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC").

The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. An apparatus comprising:
    a platform comprising a housing defining an interior space;
    a harness connected to the platform and positioned to be grasped by an operator;
    one or more wheels connected to the platform and supporting the platform above the ground;
    a motor connected to the one or more wheels, wherein the motor is configured to rotate the one or more wheels;
    one or more sensors connected to one of the housing or the harness, wherein the one or more sensors are configured to sense information about a local environment and generate sensor data associated with the local environment; and
    a computing device in communication with the one or more sensors and the motor, wherein the computing device is configured to:
        receive the sensor data;
        determine, based on the sensor data, one or more objects in a path of the apparatus; and
        engage, based on the one or more objects in the path of the apparatus, the motor to control the one or more wheels to avoid the one or more objects in the path of the apparatus.

2. The apparatus of claim 1, wherein the one or more sensors comprise one or more of a Light Detection and Ranging (LiDAR) sensor, an ultrasonic sensor, a proximity sensor, a radar sensor, an infrared sensor, or an imaging sensor.

3. The apparatus of claim 1, wherein each sensor of the one or more sensors is located at an elevation of one or more elevations, wherein each elevation of the one of more elevations is associated with a sensor zone of one or more sensor zones.

4. The apparatus of claim 3, wherein each sensor is configured to sense information about a sensor zone of the one or more sensor zones of the local environment.

5. The apparatus of claim 3, wherein the computing device is further configured to cause, based on the one or more objects in the path of the apparatus, one or more messages to be sent to the operator of the apparatus.

6. The apparatus of claim 5, wherein the one or more messages comprises a message corresponding to one or more objects detected in each sensor zone of the one or more sensor zones.

7. The apparatus of claim 1, wherein the computing device configured to engage the motor to control the one or more wheels comprises the computing device configured to engage the motor to control the one or more wheels to one or more of speed up, slow down, stop, or turn in one or more directions.

8. The apparatus of claim 7, wherein the one or more wheels comprises at least two wheels, wherein the motor is configured to control the at least two wheels to turn in one or more directions by controlling the at least two wheels to turn in opposite directions.

9. The apparatus of claim 1, wherein the computing device is further configured to determine a route from a current location to a destination location.

10. The apparatus of claim 9, wherein the computing device is further configured to cause one or more messages to be sent to the operator of the apparatus to guide the operator from the current location to the destination location.

11. The apparatus of claim 9, wherein the computing device is further configured to engage the motor to control the one or more wheels to move according to the determined route.

12. A method comprising:
    determining, by a device, a forward path of the device, wherein the device comprises:
        a platform comprising a housing defining an interior space,
        a harness connected to the platform and positioned to be grasped by an operator of the device,
        a motor connected to one or more wheels, and
        one or more sensors connected to one of the housing or the harness;
    receiving, by the device, from the one or more sensors, sensor data associated with a local environment associated with the forward path;
    determining, based on the sensor data, one or more objects in the forward path of the device; and
    engaging, based on the one or more objects in the forward path of the device, the motor to control the one or more wheels of the device to avoid the one or more objects in the forward path of the device.

13. The method of claim 12, wherein the one or more sensors comprise one or more of a Light Detection and Ranging (LiDAR) sensor, an ultrasonic sensor, a proximity sensor, a radar sensor, an infrared sensor, or an imaging sensor.

14. The method of claim 12, wherein each sensor of the one or more sensors is located at an elevation of one or more elevations, wherein each elevation of the one of more elevations is associated with a sensor zone of one or more sensor zones.

15. The method of claim 14, wherein each sensor is configured to sense information about a sensor zone of the one or more sensor zones of the local environment.

16. The method of claim 14, further comprising causing, based on the one or more objects in the forward path of the device, one or more messages to be sent to the operator of the device.

17. The method of claim 16, wherein the one or more messages comprises a message corresponding to one or more objects detected in each sensor zone of the one or more sensor zones.

18. The method of claim 12, wherein engaging the motor to control the one or more wheels comprises engaging the motor to control the one or more wheels to one or more of speed up, slow down, stop, or turn in one or more directions.

19. The method of claim 18, wherein the one or more wheels comprises at least two wheels, wherein the motor is configured to control the at least two wheels to turn in one or more directions by controlling the at least two wheels to turn in opposite directions.

20. The method of claim 12, further comprising:
    determining a route from a current location to a destination location;
    causing one or more messages to be sent to the operator of the device to guide the operator from the current location to the destination location; and
    engaging the motor to control the one or more wheels to move according to the determined route.

* * * * *